United States Patent [19]

Avicola

[11] Patent Number: 4,545,253
[45] Date of Patent: Oct. 8, 1985

[54] FIBER OPTICAL MODULATOR AND DATA MULTIPLEXER

[75] Inventor: Kenneth Avicola, Kingwood, Tex.

[73] Assignee: Exxon Production Research Co., Houston, Tex.

[21] Appl. No.: 596,889

[22] Filed: Apr. 5, 1984

Related U.S. Application Data

[63] Continuation-in-part of Ser. No. 527,713, Aug. 29, 1983, abandoned.

[51] Int. Cl.$^4$ .............................................. G02B 5/14
[52] U.S. Cl. .................................... 73/655; 250/227; 367/140
[58] Field of Search ................. 73/655, 657; 367/140, 367/149; 332/7.51; 250/227; 350/96.15, 96.16, 96.24

[56] References Cited

U.S. PATENT DOCUMENTS

| | | | |
|---|---|---|---|
| 4,071,753 | 1/1978 | Fulenwider et al. | 73/655 |
| 4,268,116 | 5/1981 | Schmadel et al. | 367/140 |
| 4,286,468 | 9/1981 | Altman | 367/140 |
| 4,295,738 | 10/1981 | Meltz et al. | 73/800 |
| 4,313,185 | 1/1982 | Chovan | 73/657 |
| 4,320,475 | 3/1982 | Leclerc | 367/140 |
| 4,360,247 | 11/1982 | Beasley | 367/140 |
| 4,390,974 | 6/1983 | Siems | 367/130 |
| 4,432,599 | 2/1984 | McMahon | 250/227 |
| 4,436,365 | 3/1984 | Hodgins et al. | 350/96.16 |
| 4,461,536 | 7/1984 | Shaw et al. | 367/140 |
| 4,471,474 | 9/1984 | Fields | 73/655 |
| 4,475,033 | 10/1984 | Willemsen et al. | 250/227 |
| 4,486,657 | 12/1984 | Bush | 250/227 |

OTHER PUBLICATIONS

J. A. Bucaro, H. D. Dardy, and E. F. Carome, "Fiber-Optic Hydrophone", Journal Acoustic Society of America, vol. 62, No. 5, pp. 1302-1304, (Nov. 1977).

S. K. Sheem and J. H. Cole, "Acoustic Sensitivity of Single-Mode Optical Power Dividers", Optics Letters, vol. 4, No. 10, p. 322, (Oct. 1979).

Primary Examiner—Stephen A. Kreitman
Attorney, Agent, or Firm—Alfred A. Equitz

[57] ABSTRACT

A data gathering system comprising a single optical fiber having one or more modulators formed thereon, means for launching into the fiber an interrogating light pulse which propagates in a first direction, means for generating at each modulator an optical return signal which propagates in the fiber in a second direction opposite the first direction and which has an intensity which is variable in response to variations in an external signal incident at the modulator, and means for detecting and processing each such return signal. The return signal comprises a portion of the interrogating light pulse which is coupled into the fiber in the second direction via evanescent coupling. The return signal from each modulator (or array of modulators) is identified via time division multiplexing. A signal processing means may be coupled to the fiber for generating a unique return signal from each of one or more modulator arrays, each array comprising a selected subset of the modulators. In a preferred embodiment, each modulator comprises a looped section of the fiber having a coupling region in which the distance between adjacent fiber segments is variable in response to variations in an external signal incident thereon. In another embodiment, each modulator comprises a short fiber segment positioned adjacent to the main fiber and separated therefrom by a distance variable in response to pressure changes incident on the modulator.

22 Claims, 13 Drawing Figures

FIBER OPTICAL MODULATOR AND DATA MULTIPLEXER

CROSS REFERENCE TO RELATED APPLICATION

This application is a continuation-in-part of copending U.S. patent application Ser. No. 527,713 by Kenneth Avicola, filed Aug. 29, 1983 now abandoned and assigned to Exxon Production Research Company, which is hereby incorporated by reference.

BACKGROUND OF THE INVENTION

The present invention relates generally to systems employing time division multiplexing for gathering data from two or more sensors and to sensors and modulators used in such systems. Throughout this specification, the term "sensor" will be used to denote a device for detecting a physical phenomenon under test and directly converting the detected signal to a modulated sensor output signal. Throughout this specification, the term "modulator" will be used to denote the broad class of devices which includes both "sensors" and devices (used in conjunction with "sensors") that do not directly detect a physical phenomenon under test, but instead receive the output signal of a sensor and convert such sensor output signal into another type of modulated signal suitable for transmission. More particularly, the present invention relates to modulators (and sensors) capable of modulating the intensity of an interrogating light signal in response to variations in an incident signal, and to time division multiplexing data gathering systems comprising one or more arrays of such modulators (or sensors).

The invention utilizes the effect known as "evanescent field coupling," whereby a portion of the electromagnetic energy injected into an optical fiber segment is coupled to an adjacent optical fiber segment, with the intensity of the coupled portion depending on the separation between the two fiber segments. Signals incident on the modulator (and sensor) disclosed herein cause displacement of a fiber segment through which an interrogating light pulse propagates relative to another fiber segment to produce a coupled return signal in the latter segment whose intensity depends on the separation between the two segments at the instant the interrogating pulse passes through the former segment.

In gathering data from a large number of sensors, two general types of methods have been used. In the first, a wire pair is run from each sensor to a data recording unit. In the second, some form of multiplexing is used so that data from many sensors is impressed on a data bus consisting of a single wire pair, coaxial cable, or optical cable. In practicing the second type of method, a saving in wire (or other data transmission material) and space for cable runs is realized. However, in practicing conventional embodiments of such type of method, a significant amount of electronic equipment has generally been required to digitize and encode information from each sensor input location. In practicing the method of the present invention, the advantages of multiplexing are obtained, and the amount of electronic equipment required at each sensor-data bus interface is reduced.

One important application for the present invention is in the field of marine seismology. In marine seismology the most commonly employed technique for obtaining geophysical data is the reflection seismograph technique which typically requires the use of a large number of hydrophone arrays connected to form what is known as a "marine streamer." The marine streamer is towed behind a seismic vessel. The individual hydrophones may be made up of a piezoelectric element which converts acoustic signals to electrical signals. Marine streamers typically use electrical cables to transmit such electrical signals from the submerged hydrophones to instruments which display or record these signals on board the seismic vessel.

A typical marine streamer may have 200 hydrophone arrays. Each array may be 15 meters long and may be made up of 17 hydrophones in parallel. Such a marine streamer would be three kilometers long, would have 3400 hydrophones, and would require at least 400 wires running the length of the electrical cable to connect each array with the vessel. In addition, other wires would be needed for depth measurement, control, and other purposes. The cable diameter necessary for accommodating such a large number of wires would be about 3 inches.

Longer marine streamers are desirable, but extension of the apparatus commonly used in the art would be awkward because of the need for increased cable diameter to accommodate such increased length. Another approach that has been taken utilizes a digital streamer. In this type of system, the data from each array is digitized, multiplexed, and then transmitted down a data bus to instruments on board the seismic vessel. This digital streamer approach, although allowing smaller diameter streamers, results in a more expensive system in the water, and usually requires relatively large diameter electronics packages positioned at various locations along the streamer which act as noise sources as the streamer is dragged through the water.

Systems have been proposed which employ optical transducers for converting acoustic vibrations incident on a device such as a hydrophone or geophone into optical signals, and then into electrical signals. Such systems would replace the conventional piezoelectric transducers with generally more complex fiber optic transducers. The problem of transmitting many such signals down the streamer remains the same.

One method of alleviating the problem of increased cable diameter is through the use of optical fibers in place of the electrical wiring. Fiber optic systems have been proposed which convert incident acoustic vibrations into optical signals and maintain such optical signals in optical form for transmission. Such previously proposed systems employ couplers and lossy sensors which severely limit the number of signals which practically can be handled.

U.S. Pat. No. 4,071,753, issued Jan. 31, 1978 to Fulenwider et al. discloses several embodiments of an optical transducers which comprises a source of optical power connected to one end of an input optical fiber, means for varying the portion of optical power coupled between the other end of the input optical fiber and one end of an output optical fiber in response to oscillatory mechanical motion indicative of incident acoustic vibrations. One embodiment of the Fulenwider et al. transducer, discussed at column 6, lines 28 through 58, utilizes the effect known in the art as "microbending" by applying a varying degree of bending to an optical fiber to cause light propagated through the fiber to radiate away from the fiber in the vicinity of the bend, thus decreasing the amount of optical power transmitted through the bend as a function of its radius of curvature. Fulenwider et al., however, neither discusses the effect of evanescent field coupling between cores of adjacent optical fibers nor discloses any optical transducer utilizing such effect.

Another type of fiber optic transducer mechanism relies on phase modulation in a single mode fiber immersed in a fluid. The phase modulation in such a system is due to changes in the optical length of the fiber induced by sound waves propagating in the fluid. See, for example, J. A. Bucaro, H. D. Dardy, and E. F. Carone, "Fiber-optic hydrophone", Journal Acoustic Society of America, Vol. 62, No. 5, pp. 1302-1304, 1977.

A related optical transducer system is disclosed in U.S. Pat. No. 4,313,185 issued Jan. 26, 1982 to Chovan. Chovan discloses a hydrophone system comprising a first and a second single mode optical fiber and means for coupling light from the first fiber to the second fiber and from the second fiber to the first fiber. The optical length of the optical coupling path between the two fibers is modulated in response to acoustic vibrations incident on the fibers. The phase and frequency of light traversing the optical coupling path will vary with the optical length of the path and the rate of change thereof, respectively. Chovan neither discusses the effect of evanescent field coupling between cores of adjacent optical fibers nor discloses any optical transducer utilizing such effect.

U.S. Pat. No. 4,295,738, issued Oct. 20, 1981 to Meltz et al., discloses a fiber optic strain sensor comprising a single mode optical fiber having two or more cores positioned in a common cladding. At one end of the fiber, one of the cores is illuminated, and as the light propagates down the fiber, some light is coupled to adjacent cores due to crosstalk. Detector means are provided at the other end of the fiber for measuring the intensity of light emerging from each core. A pressure change or strain acting on the fiber causes a change in the indices of refraction of the cores and cladding and in the dimensions of the fiber. This results in a change in the crosstalk between the cores and thus in a change in the intensity of light emerging from the cores.

The Meltz et al. apparatus has limited sensitivity due to the placement of several cores within the relatively rigid structure of a single fiber. This structure de-emphasizes the effect of possible changes in core separation which may result from the application of strain or pressure to the fiber. Also the Meltz et al. apparatus is limited in that it requires a single mode optical fiber, and could not be used with a multi-mode optical fiber.

A different type of optical transducer system, which may be suitable in a hydrophone for some applications, is disclosed in U.S. Pat. No. 4,268,116, issued May 19, 1981 to Schmadel et al. The Schmadel et al. method and apparatus produces a modulated light signal in a single mode clad optical fiber by varying the frequency and/or phase of a narrow band of light reflected back to its source by an optical grating, by sliding the optical grating relative to the fiber near its core. The Schmadel et al. apparatus depends on the phenomenon of Bragg reflection by the optical grating. The present invention, however, requires no such optical grating and does not utilize the Bragg reflection phenomenon.

The effect of "evanescent field coupling," whereby a portion of the electromagnetic energy in an optical fiber is coupled to an adjacent optical fiber, is well understood. The coupling effect occurs between multi-mode fibers as well as between single-mode fibers. It has been recognized that the magnitude of power so coupled between two fibers depends on the separation between them. It also has been recognized that the effect could, in principle, be utilized in a transducer to produce an intensity-modulated signal in response to a variation in the separation between two optical fibers. See, for example, S. K. Sheem and J. H. Cole, "Acoustic Sensitivity of Single-Mode Optical Power Dividers", Optics Letters, Vol. 4, No. 10, p. 322 (1979). The apparatus of the present invention, however, utilizes the evanescent field coupling effect in a manner not previously suggested in the art.

SUMMARY OF THE INVENTION

The apparatus of the present invention comprises an optical fiber having one or more detector sections, means for launching a narrow interrogating light pulse into the fiber, means for producing an optical return signal at each of the detector sections, the intensity of which return signal varies in response to variations in an external signal incident on the detector section, means for launching the return signals into the fiber in the direction opposite to the direction of the interrogating pulse, and means for detecting and processing the return signals.

In the preferred embodiment, each detector section is formed by looping a section of the fiber back on itself, bringing the adjacent fiber cores in close proximity in a coupling region wherein the adjacent cores are separated by compliant material having an index of refraction near that of the fiber cladding. The interrogating light pulse is partially coupled from the segment of fiber core first reached by the interrogating pulse to the adjacent fiber core due to the effect of evanescent field coupling. After traversing the loop, the coupled energy, whose intensity is proportional to the core separation and therefore depends on any incident signal varying the core separation, travels back along the fiber in a direction opposite to that of the interrogating pulse. Light is coupled on both passes through the coupling region, thus doubling the power of the return signal. One or more arrays, each comprising several such detector sections may be formed out of a single fiber. The return signals from the detector sections making up each array may be fed into a gated integrator or boxcar averager whose output is a unique return signal representing each such array.

In an alternative embodiment each detector section comprises a small fiber section, identical to a small section of the main fiber, positioned parallel to and separated by a small distance from the main fiber. The separation between the main fiber and small fiber section is variable in response to external signals incident on the apparatus. Due to the evanescent field coupling effect, a portion of the interrogating light pulse is coupled into such small fiber section. The ends of each small fiber section are finished flat and substantially perpendicular to the axis of the fiber section, and a high reflectivity coating is applied thereto. Since the evanescent process also couples light from the small fiber section to the main fiber, much of the captured light pulse is injected back into the main fiber, half in the same direction as the interrogating pulse; half in the opposite direction.

DESCRIPTION OF THE PREFERRED EMBODIMENT

Figure 1:
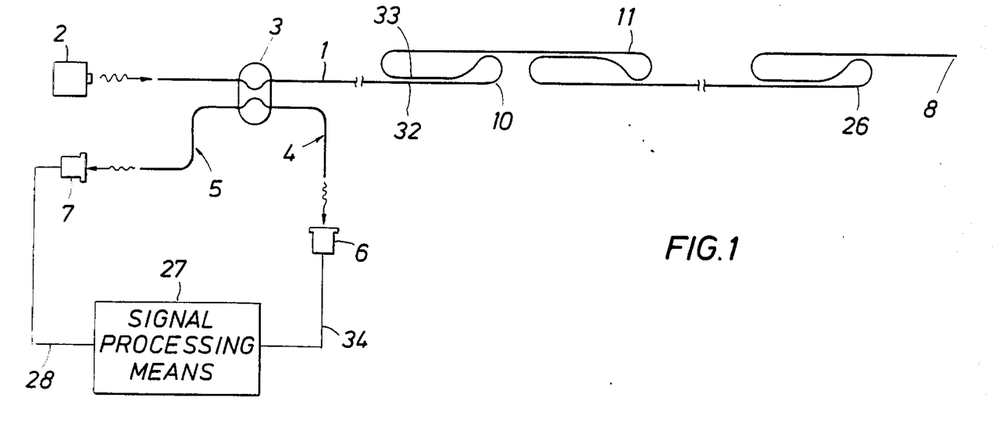
FIG. 1 is a simplified cross-sectional view of a fiber optic data multiplexer illustrating the preferred embodiment of the present invention.

FIG. 1 is a simplified cross-sectional view of a fiber optic data gathering system (also referred to herein as a "fiber optic data multiplexer") illustrating the preferred embodiment of the present invention. A section of optical fiber 1 is looped back on itself to form detector section 10. Similarly, other sections of fiber 1 are looped to form identical detector sections 11 and 26. The system may contain other detector sections, but only three detector sections are shown in FIG. 1 in order to simplify explanation of the invention. A preferred mechanical configuration of detector sections 10, 11, and 26 will be discussed in detail below with reference to FIGS. 2 and 3. It should be understood that any number of detector sections or arrays of detector sections may be formed on fiber 1.

Fiber 1 may be a single-mode fiber or a multi-mode fiber. A suitable multi-mode fiber may be fabricated in a manner well known in the art by choosing fiber dimensions and materials of fabrication so that more than one mode of electromagnetic radiation can propagate as a guided wave in the fiber. A suitable single-mode fiber may be fabricated in a manner well known in the art by choosing fiber dimensions and materials of fabrication so that only the lowest order mode (the propagating mode having lowest frequency) will propagate as a guided wave in the fiber.

Transmitter 2, capable of launching a narrow interrogating light pulse into fiber 1, is positioned at one end of fiber 1. Transmitter 2 may be a laser diode or any other suitable light source selected from those types well known in the art. Directional coupler 3 diverts a portion of the interrogating pulse to monitor photodetector 6 via optical fiber 4. The remainder of the interrogating pulse propagates through directional coupler 3 and along fiber 1 to detector sections 10, 11, and 26.

Due to the effect of evanescent field coupling, a first portion of the interrogating pulse is coupled from segment 32 of fiber 1 into segment 33 of fiber 1. Such first portion will propagate back along fiber 1 toward directional coupler 3. The remainder of the interrogating pulse will traverse the loop of detector section 10 and enter into segment 33 as it continues to propagate away from directional coupler 3. Due to evanescent coupling, a second portion of the interrogating pulse will be coupled from segment 33 into segment 32. This second portion will propagate back along fiber 1 toward directional coupler 3, along with the first portion.

Directional coupler 3 will divert part of the return signal from detector section 10 (which return signal comprises the first and second portions) to photodetector 7 via optical fiber 5. If the data gathering system includes several detector sections, a series of such return signals or pulses is received at photodetector 7, each successive return pulse produced by the next detector section along the fiber. Each return pulse amplitude is modulated by the signal of interest (which may be an acoustic signal) present at the relevant detector section at the instant the interrogating light pulse passes.

A suitable photodetector may be selected from those well known in the art. For example, photodetector Model MDA 7708, manufactured by Meret, Inc., has been found satisfactory. The return signal from detector section 10, and similarly generated return signals from detector sections 11 and 26, may be processed by signal processing means 27. Signal processing means 27 is connected to photodetector 7 by wire 28, and to monitor photodetector 6 by wire 34. Signal processing means 27 is diagrammed in FIG. 9, which will be discussed in detail below.

Directional coupler 3 may be selected from those well known in the art. A 3 dB evanescent coupler or an arrangement of external lenses and a beam-splitter would be suitable. For example, directional coupler Model T7266, manufactured by International Telephone and Telegraph Corporation, is suitable for a data gathering system employing fibers having a core diameter of 50 micrometers.

The wavelength of the interrogating pulse should be in one of the optical fiber "windows" to minimize attenuation. Such windows typically occur near 0.85 micrometers, 1.3 micrometers, and 1.55 micrometers. Injection laser diodes operating in such regions would be preferred for use as transmitter 2.

The return signal from each detector section may be uniquely identified by time division multiplexing provided that the interrogating pulse width is sufficiently narrow so that the individual return signals may be distinguished. This will occur if the two-way time of flight between detector sections is less than the optical pulse width. If the individual detector sections are evenly spaced from each other, and the interrogating pulse is sufficiently narrow, the return signals from adjacent detector sections will arrive at photodetector 7 separated by a time interval $T=2nD/c$, where D is the fiber length between adjacent detector sections, n is the index of refraction of the core of fiber 1, and c is the speed of light. The length of the loop between segments 32 and 33 of fiber 1 (and between the corresponding segments in detector section 26) should be sufficiently short so that the return signals coupled into each of the segments will reinforce. In practice, it is not necessary to resolve individual detector segments, but rather groups of detector sections, called arrays. An array may be on the order of 15 meters long and consist of many detector sections. To ensure resolution of signals between adjacent arrays, an added length of fiber, which may be coiled, can be coupled between the arrays to provide the required delay.

In order for the return signal from the detector section farthest from transmitter 2 (detector section 26 in FIG. 1) to be distinct from any reflected pulse from end 8 of fiber 1, it is preferred that the distance between end 8 and such farthest detector section be of the same magnitude as the distance between adjacent arrays. Alternatively, end 8 of fiber 1 may be connected to an energy absorptive termination (not shown in FIG. 1) to substantially eliminate any reflected pulse therefrom. Such an energy absorptive termination may be selected from those well known in the art. For example, end 8 may be immersed in a container of fluid whose index of refraction matches that of core 31.

Figure 2:
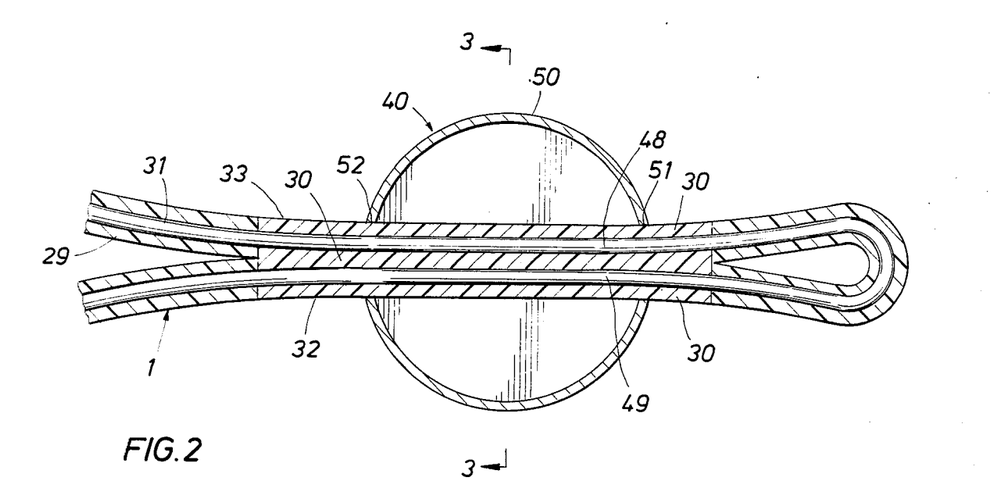
FIG. 2 is a cross-sectional view of a single optical sensor of the type employed in the system of FIG. 1.

It has been found that the intensity of the return signal from a detector section depends on the separation between the adjacent core segments, the core diameter, the fiber interaction length (which is the length of the fiber segment in which core segment 48 is substantially parallel to core-segment 49, as shown in FIG. 2), the indices of refraction of the core and cladding, and the wave length of light propagating in the fiber.

It is desirable to have the "reflected power", the power of the return signal from a detector section, be a small fraction of the power of the interrogating pulse so that changes in one detector section output will not significantly affect the output of the other detector sections. The general problem of calculating power coupled from one fiber core to an adjacent core has been treated theoretically in the literature. See, for example, A. W. Snyder and P. McIntyre, "Crosstalk between light pipes", Journal Optical Society of America, Vol. 66, No. 9, September 1976. By applying such theoretical methods, approximate expected values for system parameters can be calculated. If the core diameter is 50 micrometers, the fiber interaction length is 5 mm, the ratio of the index of refraction of the fiber cladding to that of the fiber core is 0.99, and the wavelength of light propagating in the fiber is 0.85 micrometers, then the ratio of the reflected power from a detector section to the power of the interrogating pulse will be less than 0.0001 when the fiber core separation exceeds 3.5 micrometers. A method for compensating for the effect of one sensor on the others is described below with reference to FIG. 9.

FIG. 2 is a cross-sectional view of a preferred embodiment of an individual detector section of the system illustrated in FIG. 1. The detector section shown in FIG. 2 is particularly suitable for use as a hydrophone. Fiber 1 consists of fiber core 31 surrounded by cladding 29. To form a detector section of the type shown in FIG. 2, fiber core segments 49 and 48 in the region of segments 32 and 33 of fiber 1, respectively, are stripped of cladding and then reclad with compliant cladding material 30 when the core segments are in position with core segment 48 substantially parallel to core segment 49. The cladding of glass-clad fibers can be removed by a chemical etch process. Plastic clad silica (PCS) fibers can be stripped by a combination of heat and mechanical removal. In the case of PCS fibers, the detector section can be reclad with silicone elastomer, having index of refraction substantially identical to the original cladding. Suitable recladding materials include RTV, manufactured by General Electric Company, and Sylgard, manufactured by Dow Corning Corporation.

In an alternate embodiment, the stripped fiber segments may be held in position by an assembly such as structure 80 (shown in FIG. 5) to obtain the correct operating bias point (i.e., mean separation between core segments 48 and 49) and may be coated with an index fluid or gel having substantially the same index of refraction as the original cladding material. Such embodiment will be discussed in greater detail below with reference to FIG. 5.

The detector section shown in FIG. 2, suitable for use as a hydrophone, has acoustic sensitivity due to the compliance of cladding 30. The change in the indices of refraction of the cores and cladding with pressure also produces an acoustic sensitivity. Structure 40 which includes cylinder 50, is attached to the coupling region of fiber 1 to increase the acoustic sensitivity of the detector section. Structure 40 may be more easily described with reference to FIG. 3.

Figure 3:
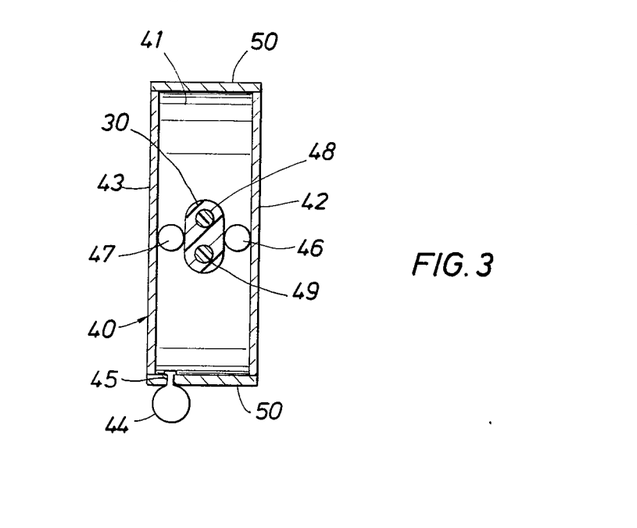
FIG. 3 is a cross-sectional view taken along line 3—3 of FIG. 2, showing the preferred mechanical configuration of the sensor coupling region.

FIG. 3 is a cross-sectional view of the detector section shown in FIG. 2, taken on a plane normal to the optical fiber axis in the coupling region. Structure 40 comprises a sealed enclosure formed by attaching diaphragms 42 and 43 to the top and bottom, respectively, of cylinder 50. Cylinder 50 has through its face passages 51 and 52, each dimensioned for admitting the coupling region of fiber 1 while sealing the interior 41 of structure 40.

Incident acoustic vibrations will displace diaphragms 42 and 43, urging cylindrical pin 46 (wedged between diaphragm 42 and compliant cladding 30) to oscillate relative to cylindrical pin 47 (wedged between diaphragm 43 and cladding 30). A pressure increase in the medium surrounding structure 40 will urge diaphragms 42 and 43 toward each other, urging pins 46 and 47 toward each other, and thus urging core segments 48 and 49 away from each other. Cladding 30 is selected to be compliant to enable core segments 48 and 49 to move relative to each other in response to incident acoustic vibrations.

The interior 41 of structure 40 is sealed from the exterior thereof and contains air. Also provided is a flexible member such as rubber bladder 44, which has its inside exposed to interior 41 and its outside exposed through passage 45 in cylinder 50 to the medium surrounding structure 40. Rubber bladder 44 should be capable of expanding and contracting to force air through passage 45 to maintain substantially constant the separation between core segments 48 and 49 in response to slow, or low frequency variations in the pressure of the medium surrounding structure 40, such as the pressure change occurring when structure 40 is deployed off a seismic vessel to its operating depth beneath the ocean surface. Passage 45 should sufficiently restrict air flow therethrough so that the separation between core segments 48 and 49 will vary in response to fast or high frequency (i.e. above a few hertz) variations in the pressure of the medium surrounding structure 40, such as the pressure variations caused by incident acoustic radiation of interest.

Figure 4:
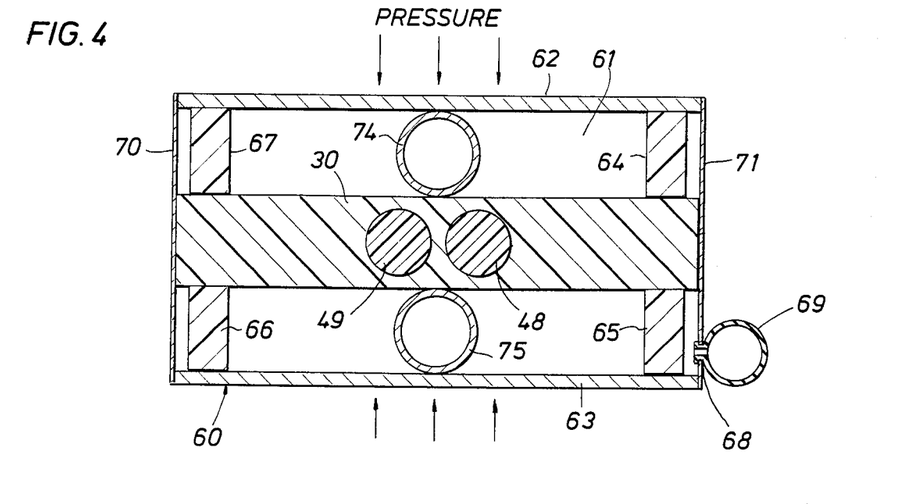
FIG. 4 is a cross-sectional view of a sensor of the type employed in the system of FIG. 1, taken on a plane normal to the optical fiber axis in the coupling region showing an alternative mechanical configuration for the coupling region.

FIG. 4 is a cross-sectional view of an alternate embodiment (also suitable for use as a hydrophone) of the detector section shown in FIG. 2, taken on a plane normal to the axis of fiber core 48 in the coupling region. FIG. 4 shows an alternate structure 60 for increasing the acoustic sensitivity of the detector section. Structure 60 comprises an enclosure formed by plates 62 and 63, and flexible membranes 70 and 71. Structure 60 will also have end plates (not shown) to prevent fluid intrusion into its air-filled interior 61. Plate 62 is supported and separated from compliant cladding 30 by pin 74 and supports 64 and 67. Plate 63 is supported and separated from cladding 30 by pin 75 and supports 65 and 66. Incident acoustic vibrations will tend to displace plates 62 and 63, urging pin 74 to oscillate relative to pin 75. A pressure increase in the medium surrounding structure 60 will urge pins 74 and 75 toward each other, thus urging core segments 48 and 49 away from each other.

Supports 64, 65, 66, and 67 may be composed of a suitable elastic material. A silicon elastomer such as RTV or Sylgard has been found appropriate. To form support made of a silicone elastomer, the silicone elastomer is cured with pressure applied to plates 62 and 63 and pins 74 and 75 in position to obtain the correct operating bias point, i.e., mean separation between cores 48 and 49.

Also provided is a flexible member such as rubber bladder 69, which has its inside exposed to interior 61 through passage 68 and its outside exposed to the medium surrounding structure 60. Rubber bladder 69 and passage 68 serve the same function as rubber bladder 44 and passage 45 described above with reference to FIG. 3. In particular, rubber bladder 69 is capable of expanding and contracting to force a sufficient volume of air through passage 68 to prevent slow variations in the pressure of the medium surrounding structure 60 from affecting the separation between core segments 48 and 49.

Figure 5:
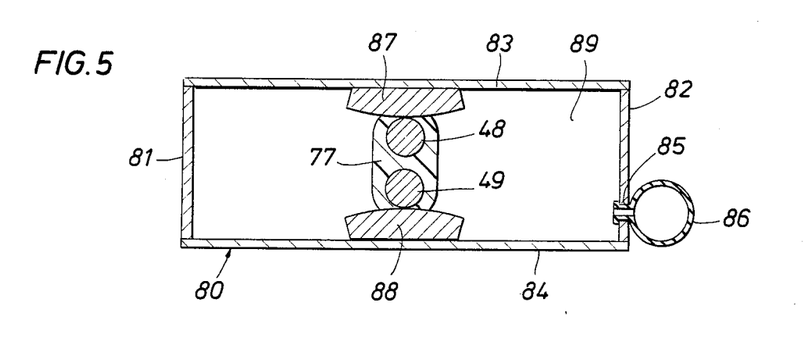
FIG. 5 is a cross-sectional view of a sensor of the type employed in the system of FIG. 1, taken on a plane normal to the optical fiber axis in the coupling region showing another alternative mechanical configuration for the coupling region.

FIG. 5 is a cross-sectional view of another alternate embodiment (also suitable for use as a hydrophone) of an individual detector section of the type shown in FIG. 1, taken on a plane normal to the axis of the optical fiber in the coupling region. Structure 80 of FIG. 5 is provided for increasing the acoustic sensitivity of the detector section. Structure 80 comprises a sealed enclosure formed by attaching diaphragms 83 and 84 to the top and bottom, respectively, of the rectangular frame comprising plates 81 and 82, and end plates (not shown in FIG. 5). The end plates each have a passage sized for admitting the coupling region of fiber 1 while sealing the interior 89 of structure 80. It should be recognized that the shape of diaphragms 83 and 84 and the frame to which the diaphragms are attached need not be rectangular. Alternatively the diaphragms may be disc-shaped and the frame may be cylindrical, with a pair of passages, each sized for admitting the coupling region of fiber 1 while sealing the interior 89 of structure 80, extending through opening regions of the cylindrical frame.

Incident acoustic vibrations in a liquid medium surrounding structure 80 will displace diaphragms 83 and 84, urging member 87 (wedged between core segment 48 of fiber 1 and diaphragm 83) to oscillate relative to member 88 (wedged between core segment 49 of fiber 1 and diaphragm 84). Core segments 48 and 49 are coated with an index fluid or gel 77 having substantially the same index of refraction as the original cladding 29 (not shown in FIG. 5) of fiber 1. Refractive index liquid, series AA, manufactured by Cargille Laboratories, has been found suitable for use as index fluid 77.

A pressure increase in the medium surrounding structure 80 will urge core segments 48 and 49 closer together. In contrast, a pressure increase in the medium surrounding structure 40 (shown in FIG. 3) will urge core segments 48 and 49 farther away from each other.

The interior 89 of structure 80 contains air and is sealed from the surrounding medium. Also provided is a flexible member such as rubber bladder 86 for maintaining hydrostatic balance in the manner described above with reference to rubber bladder 44 in FIG. 3. Rubber bladder 86 has its inside exposed to interior 89 through passageway 85 and its outside exposed to the medium surrounding structure 80.

Figure 6:
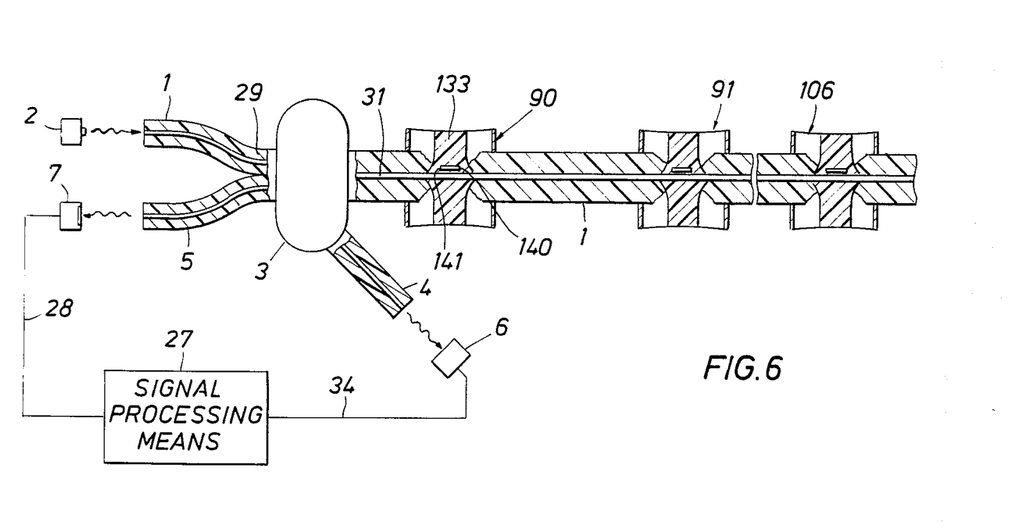
FIG. 6 is a simplified cross-sectional view of a fiber optic data multiplexer illustrating an alternate embodiment of the present invention.

A fiber optic data multiplexer illustrating an alternate embodiment of the present invention is illustrated in simplified form by FIG. 6. As in the preferred embodiment described above with reference to FIG. 1, one or more identical sensors are formed on a single optical fiber, which sensors are interrogated by an interrogating light pulse emitted from transmitter 2 positioned at one end of fiber 1, and passed through directional coupler 3. Identical sensors 90, 91, and 106 are indicated in FIG. 6, though any positive integral number of sensors may be employed in the array. Each of sensors 90, 91, and 106 is suitable for use as a hydrophone (and will be referred to hereinafter as a "hydrophone"), for modulating the interrogating light pulse in response to acoustic vibrations incident thereon. Each hydrophone comprises a small fiber segment, substantially identical to fiber segment 110 in hydrophone 90, held near and substantially parallel to fiber 1 and separated from fiber 1 by compliant fiber separator 133. Segment 110 has diameter substantially equal to that of fiber 1, and is a short, integral, truncated piece of optical fiber having length, for instance, on the order of one centimeter. End faces 140 and 141 of segment 110 are substantially normal to the axis of the segment and finished flat, and are coated with a high reflectivity coating of suitable type selected from those well known in the art.

Due to the effect of evanescent field coupling, a small portion of the interrogating light pulse is coupled into segment 110. Segment 110 forms a cavity in which the coupled portion is repeatedly reflected between end faces 140 and 141. Since the evanescent process also works to couple light from segment 110 back to fiber 1, much of the light coupled into segment 110 is injected back into fiber 1. During each pass of the coupled portion through segment 110 from end face 140 toward end face 141, light is coupled back into fiber 1 so as to propagate toward transmitter 2. During each pass of the coupled portion through segment 110 from end face 141 toward end face 140, light is coupled back into fiber 1 so as to propagate away from transmitter 2. Thus, about half the light injected back into fiber 1 propagates in the direction toward transmitter 2, and about half propagates in the direction away from transmitter 2. The actual amount injected into fiber 1 depends on the ratio of the reflectivity of end faces 140 and 141 to the "coupling fraction". The "coupling fraction" is the fractional power coupled from segment 110 to fiber 1 per pass through the coupling region from one end face to the other. The coupling fraction in turn depends on the separation between segment 110 and fiber 1, which varies in response to acoustic vibrations incident on hydrophone 90.

The portion of light injected from segment 110 to fiber 1 in the direction of transmitter 2 will be referred to as the "return pulse" from segment 110. Directional coupler 3 diverts a portion of the return pulse to photodetector 7 via fiber 5. The return pulses from hydrophones 90, 91, and 106 may be processed by signal processing means 27, connected to photodetector 7 by wire 28 and to monitor photodetector 6 by wire 34. Signal processing means 27 will be discussed in detail below with reference to FIG. 9.

Figure 7:
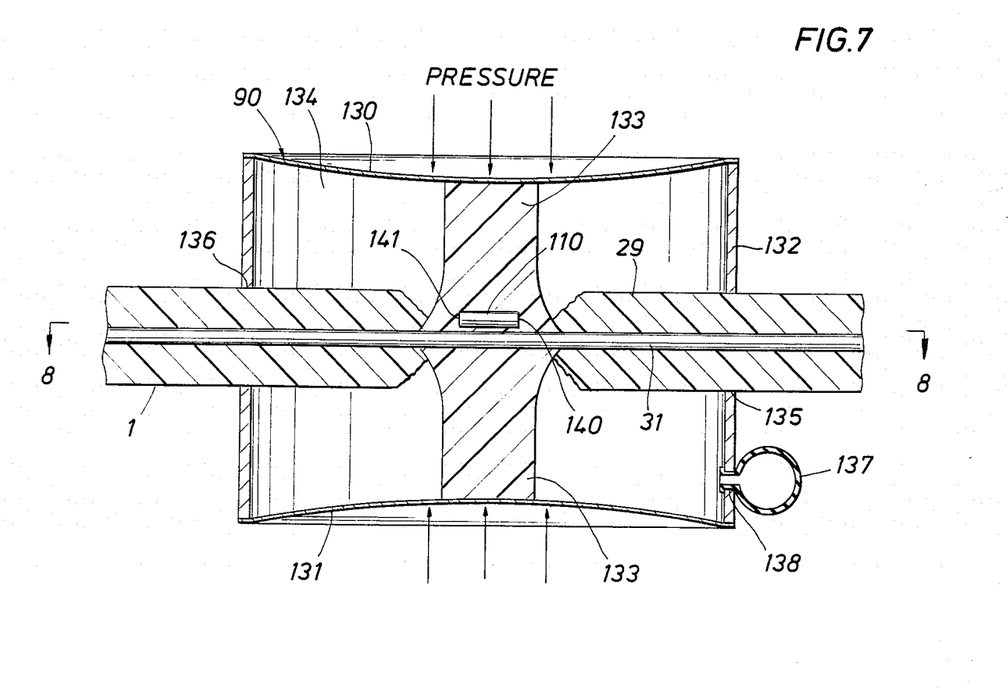
FIG. 7 is a cross-sectional view of a single fiber optic sensor (optical hydrophone) of the type employed in the system of FIG. 6.
Figure 8:
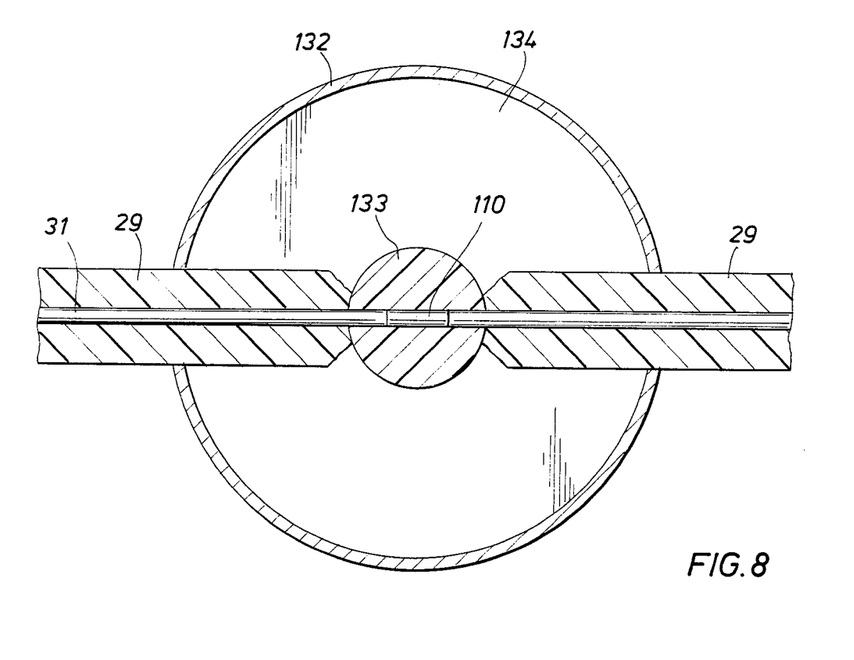
FIG. 8 is a cross-sectional view taken along line 8—8 of FIG. 7.

FIG. 7 is an enlarged cross-sectional view of hydrophone 90 shown in FIG. 6. FIG. 8 is a cross-sectional view of hydrophone 90 taken along line 8—8 of FIG. 7. Diaphragms 130 and 131 are stretched respectively across the top and bottom of rigid cylindrical housing 132 to seal air-filled interior 134 of hydrophone 90 from the surrounding medium. Passage 135 and passage 136, sized to admit fiber 1 yet prevent fluid intrusion into interior 134 of hydrophone 90, extend through opposite sides of housing 132.

Also attached to hydrophone 90 is a flexible member such as rubber bladder 137 for maintaining hydrostatic balance in the manner described above with reference to rubber bladder 44 in FIG. 3. Rubber bladder 133 has its inside exposed to interior 134 through passageway 138 in housing 132, and its outside exposed to the medium surrounding hydrophone 90.

To manufacture hydrophone 90, cladding 29 is stripped from a segment of core 31 of fiber 1 and fiber separator 133 formed on the stripped core segment. Fiber separator 133 should be composed of material such as a silicone elastomer having substantially the same index of refraction as cladding 29 and having a relatively low viscosity when uncured but which hardens into a compliant body when cured. Sylgard 184, manufactured by Dow Corning Corporation, has been found suitable for forming fiber separator 133. Segment 110 is positioned in uncured fiber separator 133 substantially parallel to core 31 and separated at a selected distance therefrom. When cured, fiber separator 133 is bonded to the stripped segment of core 31, to diaphragms 130 and 131, and to segment 110. Cured fiber separator 133 will hold segment 110 at the selected position substantially parallel to core 31, until acoustic vibrations incident on diaphragms 130 and 131 result in displacement of segment 110 relative to core 31.

As the interrogating light pulse passes through hydrophone 90 (toward the right in FIG. 7) a portion thereof will be coupled into segment 110 due to the evanescent field coupling effect. If end faces 140 and 141 could be made totally reflecting (i.e. if they had a reflectivity of one), the coupled pulse would be repeatedly reflected between and faces 140 and 141, until the evanescant field coupling effect caused all the coupled pulse to be injected back into fiber 1, half in the direction of transmitter 2 and the other half in the direction away from transmitter 2. The actual amount of the coupled pulse injected back into fiber 1 will depend on the ratio of the reflectivity of end faces 140 and 141 to the coupling fraction per pass of the coupled pulse from one end face of segment 110 to the other. Such coupling fraction per pass will depend in turn on the separation between segment 110 and core 31, the diameters of segment 110 and core 31, the length of segment 110, the indices of refraction of segment 110, core 31, and fiber separator 133, and the wave length of the interrogating light pulse. The intensity of the portion of the coupled pulse injected back into fiber 1 in the direction of transmitter 2, i.e., the intensity of the "return pulse", will thus depend on the separation between segment 110 and core 31.

The difference between the return pulse width and the injected pulse width will depend on the reflectivity of end faces 140 and 141. The dependence may be approximated by the relationship: $T = 4.76(Z)(1/(1-R))$, where T is the difference between the return pulse width and the injected pulse width in nanoseconds, Z is the length of segment 110 in meters and R is the reflectivity of end faces 140 and 141. High end face reflectivity is desirable to obtain a strong return pulse. However, as the end face reflectivity approaches one, the return pulse width approaches infinity. Thus, the individual return pulses from hydrophones 90, 91 and 106 of the array cannot be resolved unless the end face reflectivity is chosen to be sufficiently low. The individual return pulses from adjacent hydrophones will arrive at photodetector 7 separated by a time interval $T = 2nD/c$, where D is the fiber length between the hydrophones, n is the index of refraction of core 31 of fiber 1, and c is the speed of light in a vacuum. Thus the length of segment 110 and the end face reflectivity should be chosen so that the return pulses from adjacent hydrophones can be resolved.

Figure 9:
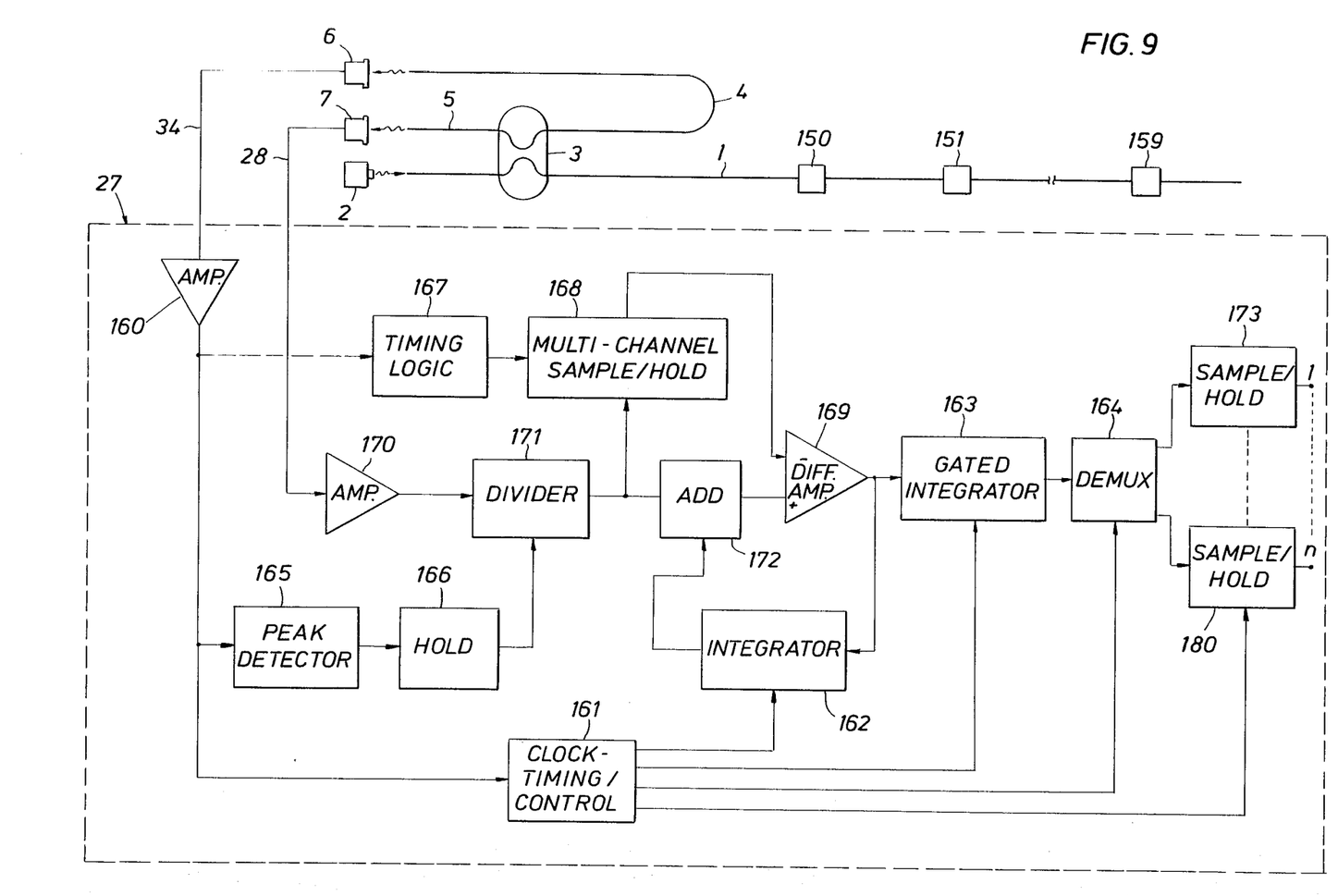
FIG. 9 is a block diagram of a fiber optic data multiplexer according to the present invention showing means for detecting and processing the return signals from the individual sensors or groups of sensors of the system.

FIG. 9 is a block diagram of a fiber optic data multiplexer according to the present invention showing signal processing means 27 for processing the return signals from individual modulators 150, 151, and 159 (and other modulators not shown). Modulators 150, 151, and 159 may be sensors of the type discussed above with reference to FIG. 1, or sensors of the type discussed above with reference to FIG. 6, or modulators of the type to be discussed below with reference to FIGS. 11 and 12. It should be understood that although only a few modulators are depicted, any number of modulators may be formed on fiber 1, that the modulators may be grouped into any number of arrays, and that arrays may be separated by selected lengths of coiled fiber to provide temporal array resolution.

An interrogating light pulse is launched from transmitter 2 into fiber 1. A portion of the interrogating pulse is diverted by directional coupler 3 to monitor photodetector 6 via fiber 4. The remainder of the interrogating pulse propagates through directional coupler 3 to modulators 150, 151 and 159. A return signal is produced by each of the modulators in response to propagation of the interrogating pulse therethrough. The power of the return signal from each modulator is indicative of the magnitude of a signal of interest incident on the modulator at the moment the interrogating pulse passes through. A portion of the return signal from each of the modulators is diverted by directional coupler 3 to photodetector 7 via fiber 5.

The output of photodetector 7 is amplified in amplifier 170 to a sufficiently high level for subsequent processing. Similarly, the output of monitor photodetector 6 is amplified in amplifier 160 to a sufficiently high level for subsequent processing.

The output of amplifier 160, related to the light output of transmitter 2, is connected to timing logic 167, to peak detector circuit 165 and to system clock 161. System clock 161 includes timing and control logic which will be discussed below. The output of amplifier 170, related to the return signals from the modulators, is connected to one input of divider circuit 171. The output of hold circuit 166 connected in series with peak detector 165, representing a signal following the peak amplitude of the output of monitor photodetector 6, is supplied to the other input of divider 171. A signal having amplitude equal to the amplitude of the output of amplifier 170 divided by the amplitude of the output of hold circuit 166 is produced by divider 171. Such signal represents the normalized instantaneous amplitude of the return signals from the individual modulators of the arrays, corrected to compensate for changes in the amplitude of the interrogating pulse.

Multi-channel sample and hold circuit 168 successively supplies to the first input of differential amplifier 169 a signal representing the normalized instantaneous amplitude of the return signals from the individual modulators when they are in a "quiet" state. When the system is employed for marine seismic applications, individual modulators 150, 151, and 159 will be in a "quiet" state at times just prior to each generation of a seismic signal whose reflections or refractions are to be detected by the modulators, provided that no significant reflected or refracted arrivals due to previously generated seismic signals are incident on the modulators at such times. Timing logic 167, connected between amplifier 160 and multi-channel sample and hold circuit 168, directs multi-channel sample and hold circuit 168 to sample and hold the output of divider 171 only at times when the modulators are in a quiet state. The held "quiet" reference signals are applied at the appropriate times to the first input of differential amplifier 169. Differential amplifier 169 will thus compensate for the effect of slow systematic changes in the average external conditions affecting the system. When the system is employed for marine seismic applications, such systematic changes will include temperature and stress changes affecting the modulators.

The output of differential amplifier 169 is connected to integrator circuit 162 and to one input of gated integrator 163. The other input of integrator circuit 162 is connected to system clock 161. One input of adding circuit 172 is connected to the output of integrator circuit 162. The other input of adding circuit 172 is connected to the output of divider 171.

The output of differential amplifier 169 represents the normalized instantaneous amplitude of the return signals from the individual modulators, corrected for changes in interrogating pulse amplitude, slow systematic changes affecting the system, and the effect of upstream modulator losses on the return signals from downstream modulators.

At any instant, the output of integrator circuit 162 represents the cumulative total power of all return signals detected by photodetector 7 from the time the most recent interrogating pulse was launched. System clock 161 has timing and control logic for resetting integrator circuit between successive modulator array readouts. Adding circuit 172 adds the output of integrator circuit 162 to the output of divider 171, to correct for the effect of upstream modulator losses (i.e., losses due to diversion, by each upstream modulator, of part of the interrogating pulse back toward transmitter 2) on the return signals from downstream modulators. The output of adding circuit 172 is supplied to the second input terminal of differential amplifier 169.

The output of differential amplifier 169 is connected to the first input of gated integrator circuit 163. System clock 161, which comprises timing and control logic, is connected to the other input of gated integrator circuit 163. Gated integrator 163 integrates the output of differential amplifier 169 over time intervals appropriately selected so that the output of gated integrator 163 is a series of signals each representing the combined power of the return signals from all modulators comprising a single uniquely identified modulator array of the system.

The output of gated integrator 163 is connected to the input of demultiplexer circuit 164. The output of demultiplexer circuit 164 is supplied to sample and hold circuits 173 through 180 (sample and hold circuits 174 through 179 are not illustrated in FIG. 9). One sample and hold circuit should be provided for each modulator array. Although eight sample and hold circuits are indicated in FIG. 9, it should be understood that the timing and control logic associated with system clock 161 can direct signal processing means 27 to form any positive integral number of arrays from the modulators formed on fiber 1. System clock 161 is connected to demultiplexer circuit 164 and sample and hold circuits 173 through 180 to direct each sample and hold circuit to sample and hold information from the output of gated integrator 163. Thus, the sample and hold circuits may be read between successive launches of the interrogating pulse into fiber 1 to obtain from each a unique signal from one array representing the total power of all return signals from the modulators comprising such array. The contents of each of sample and hold circuits 173 through 180 is updated with each launch of the interrogating pulse, which may occur at convenient time intervals such as $\frac{1}{2}$, 1, or 2 ms.

In an alternate embodiment, the output of differential amplifier 169 is fed to an array of boxcar averager circuits, one boxcar averager circuit for each modulator array. In this embodiment, system clock 161 would be connected to each boxcar averager to direct each boxcar averager to integrate the output of differential amplifier 169 over appropriately selected time intervals in order to generate, in response to each interrogating pulse, a signal representing the power of the return signals from a single uniquely identified modulator array. System clock 161 would also direct each boxcar averager to generate an averaged signal representing the average power of all the return signals from a single modulator array generated in response to a plurality of successive interrogating pulses. The gating of each boxcar averager would accomplish the demultiplexing function performed by demultiplexer 164 of FIG. 9. A boxcar averager circuit may be formed in a manner well known in the art by attaching a feedback loop to a gated integrator such as gated integrator 163 of FIG. 9.

In the alternate embodiment employing boxcar averagers, the time interval between interrogating pulses may be reduced to 0.05 or 0.1 ms, and the output of each boxcar averager sampled at any convenient independent time interval, such as $\frac{1}{2}$, 1, or 2 ms.

A fiber optic data multiplexer according to the present invention in an embodiment suitable for marine seismic applications typically may comprise 203 hydrophone arrays, each 15 meters in length. Since the velocity of light in a typical optical fiber is about 0.21 m/ns, such a system can be read out in about 29 microseconds. Thus, if gated integrator 163 integrates the pulse stream from differential amplifier 169 in intervals 142 nanoseconds in length, 203 signals (each uniquely representing the return signal from a particular array) may be generated, demultiplexed, and held during such period of about 29 microseconds. Thus the interrogating pulses may be spaced at 50 or 100 microsecond intervals, corresponding to pulse rates of 10 Khz or 20 KHz.

Figure 10:
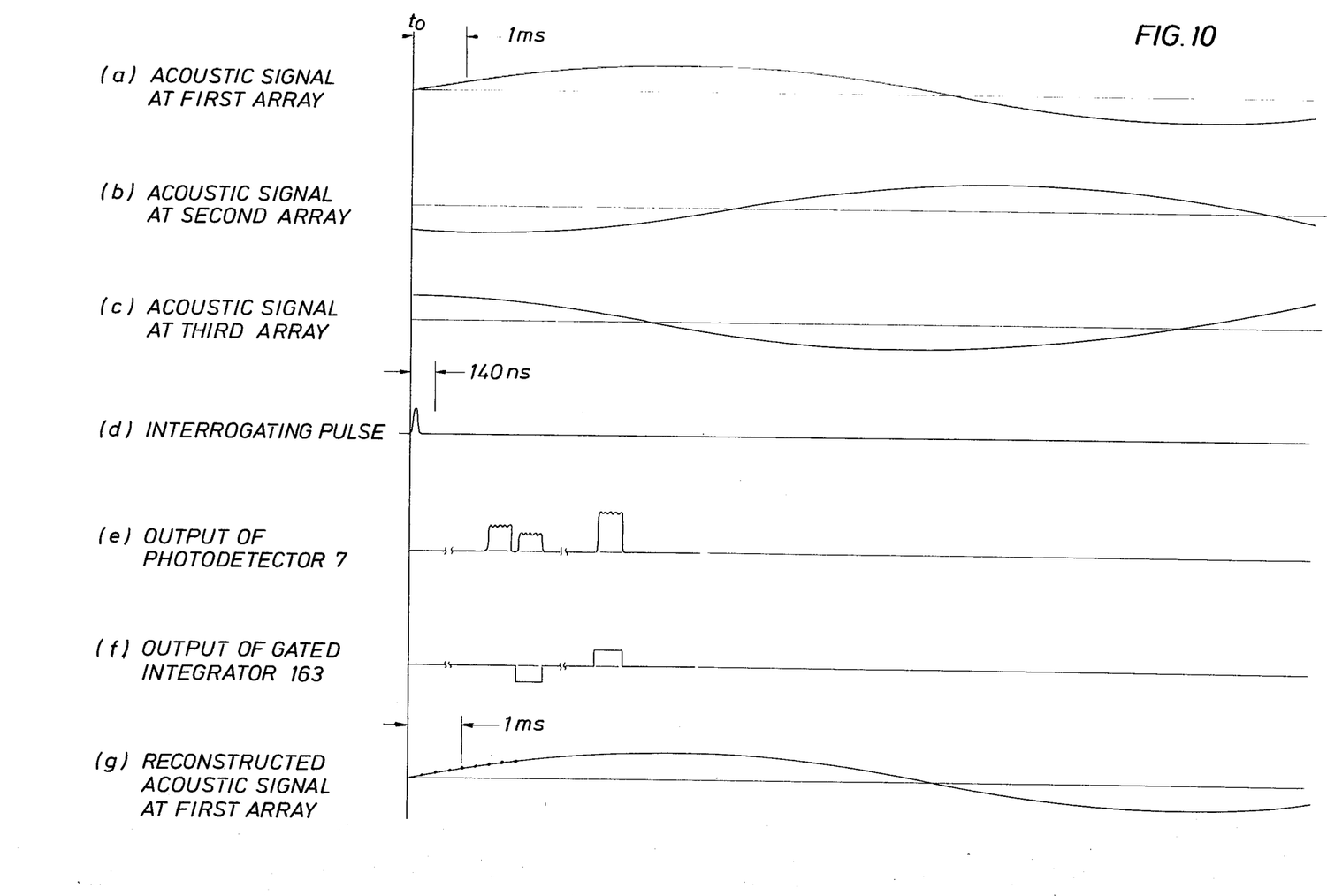
FIG. 10 is a set of seven graphs representing three external signals incident on three different groups of sensors of a fiber optical data multiplexer according to the present invention, an interrogating light pulse for interrogating the sensor array of the system, and return signals, generated in response to the interrogating light pulse, before and after processing by the signal processing means of the system.

FIG. 10 is a set of seven graphs illustrating the manner in which a fiber optic data multiplexer according to the present invention is capable of reconstructing external signals incident on the sensor or modulator arrays of the system. Hereinafter, in the discussion of FIG. 10, the external signal will be referred to as an acoustic signal, though it should be understood that the discussion may be generalized in a manner that will be obvious to those ordinarily skilled in the art to refer to all types of external signals. The system array will be referred to as comprising sensors of the type discussed above with reference to FIGS. 1 and 6, though it should be understood that the discussion may similarly be generalized to include any of the sensors and modulators described herein. The distance away from the horizontal axis of each graph represents signal amplitude. The distance away from the vertical axis of each graph represents time elapsed. The common time scale of FIGS. 10(a), 10(b), 10(c), and 10(g) is much different from the common time scale of FIGS. 10(d), 10(e), and 10(f). The origin of the horizontal axis represents the instant, $t_o$, when an interrogating pulse is launched into fiber 1 by transmitter 2.

FIG. 10(a) represents an acoustic signal incident on an individual sensor array (i.e., a first group of sensors) of the system. FIG. 10(b) represents another acoustic signal incident on a second sensor array of the array system, located farther from the transmitter than the first array. FIG. 10(c) represents a third acoustic signal incident on a third sensor array located farther from the transmitter than the second sensor array. In order to simplify explanation of the invention, it will be assumed that each of the three arrays is composed of five sensors, and that the distance between any two sensors in an array is much less than the distance between a sensor selected from one array and another sensor selected from a different array.

FIG. 10(d) represents a typical interrogating light pulse in fiber 1, at a location adjacent to transmitter 2. The width of the interrogating pulse shown is about 30 nanoseconds.

The output of photodetector 7, representing the return pulses produced in the three sensor arrays, is shown in FIG. 10(e). The pulse on the left (i.e. the pulse detected earliest 10(e). The pulse on the left (i.e. the pulse detected earliest by photodetector 7) represents the return pulse from the first sensor array. The pulse on the right represents the return pulse from the third sensor array. Each of the three pulses shown in FIG. 10(e) has five peaks or "spikes", each spike representing the return signal from one of the five individual sensors which make up each array. The pulses shown in FIG. 10(e) are electrical signals, which are subsequently processed in signal processing means 27 in the manner described above with reference to FIG. 9.

The signals shown in FIG. 10(e) will be transformed into the signals shown in FIG. 10(f) after partial processing in signal processing means 27. In particular, these signals represent the output of gated integrator 163. The amplitude of the pulse on the left has been reduced to almost zero by signal processing means 27. This reflects the near-zero amplitude of the acoustic signal incident on the first sensor array at the time when the interrogating pulse passed through that array. Similarly, the amplitude of each of the other two pulses shown in FIG. 10(f) corresponds to the amplitude of the acoustic signal incident on the sensor array associated with such pulse at the time when the interrogating pulse passed through it.

As described above, the output of gated integrator 163 is demultiplexed and held in sample and hold circuits 173 through 180. FIG. 10(g) shows a plurality of data points, each one obtained by reading the contents of the particular sample and hold circuit which stores information relating to the first sensor array. The first data point in FIG. 10(g) represents the first pulse (having near-zero amplitude) shown in FIG. 10(f). The other data points in FIG. 10(g) result from subsequent interrogations of the array system by interrogating pulses launched into fiber 1 at intervals of ¼ ms. Analysis of such data points permits reconstruction (as suggested in FIG. 10(g)) of the acoustic signal incident on the first sensor array.

The fiber optic data multiplexer system of the present invention in an embodiment including one or more sensors for directly converting a physical phenomenon under test to a modulated optical signal, may be applied in a variety of data gathering situations. The type of sensor selected for use with such embodiment of the system will depend on the particular context in which the system is employed. Several types of acoustic sensors which may be used with the preferred embodiment of the system shown in simplified form in FIG. 1, have been discussed above with reference to FIGS. 2 through 8. It should be recognized that in addition to such acoustic sensors, other types of sensors within the scope of this invention may be designed for directly modulating fiber separation in response to other types of signals, such as thermal, magnetic, and electrical signals, permitting detection of such signals.

Figure 11:
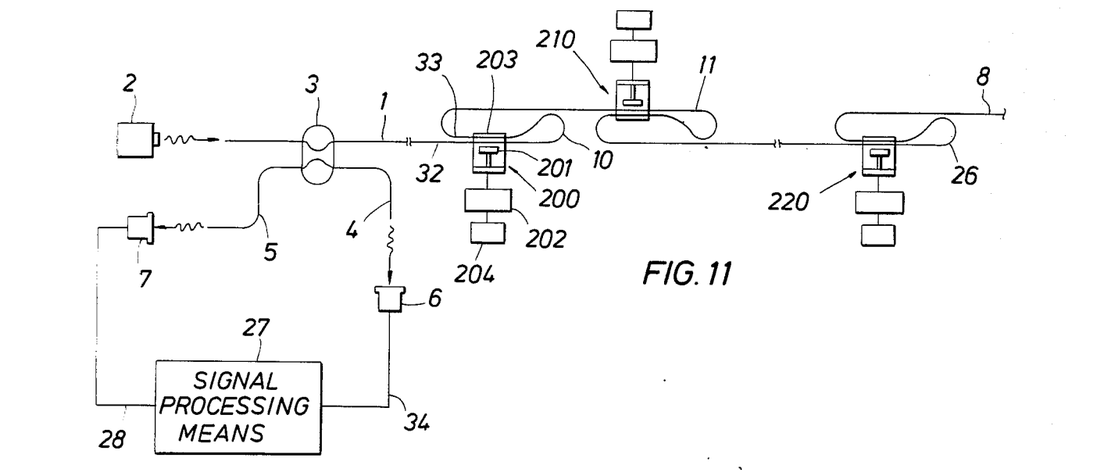
FIG. 11 is a simplified cross-sectional view of a fiber optic data multiplexer illustrating semi-schematically another preferred embodiment of the present invention.
Figures 12, 13:
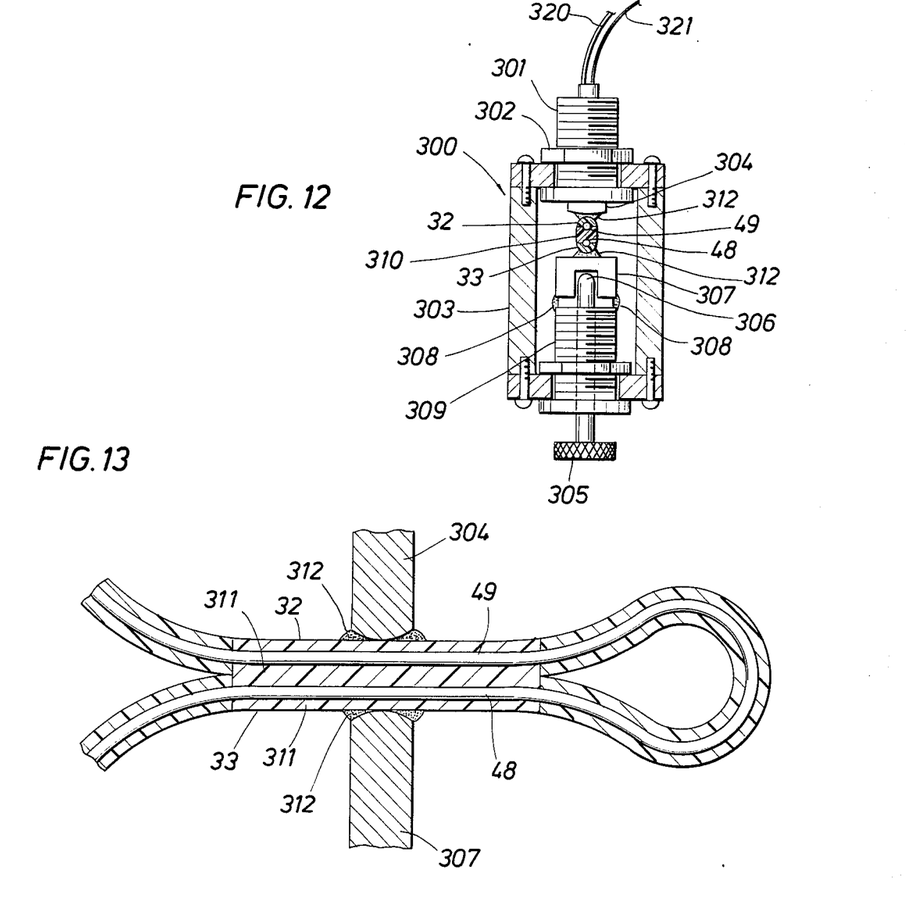
FIG. 12 is a cross-sectional view of a single optical modulator of the type employed in the system of FIG. 11.
FIG. 13 is a cross-sectional view of the coupling region of another embodiment of an optical modulator of the type employed in the system of FIG. 11.

General purpose modulators 200, 210, and 220 using the principles of the invention are shown in simple schematic form in FIG. 11, and a cross-sectional view of an individual modulator, of the type shown in FIG. 11, is shown in FIG. 12. Any conventional sensor which converts some physical phenomena such as pressure, temperature or magenetic field into an electrical signal may be used to drive modulators 200, 210, and 220. One advantage of using a general purpose modulator, rather than a sensor which directly converts the phenomena under test to a modulated optical signal, may be understood using a hydrophone array as an example. As stated earlier, in a typical marine seismology application, the output of seventeen hydrophones spread out over a fifteen meter length is used to form one array. If fiber optic sensors of the type discussed above with reference to FIGS. 2 through 8 are used to form such an array, it is still necessary to form seventeen of such devices in each fifteen meter interval. Using the general purpose modulator of FIGS. 11 and 12, however, seventeen conventional hydrophone outputs can be added together to feed a single modulator input. In this manner only one device (modulator) need be formed on the fiber in each fifteen meter interval, rather than seventeen devices (sensors).

Identical optical modulators 200, 210, and 220 are shown semi-schematically in FIG. 11. Each of modulators 200, 210, and 220 includes a pusher element identical to pusher element 201 of modulator 200, a driver identical to driver 202 of modulator 200, a conventional sensor identical to conventional sensor 204 of modulator 200, and a rigid housing identical to rigid housing 203 of modulator 200. Pusher element 201 applies a time-varying force to segment 32 of optical fiber 1 in response to a time-varying driving signal (which may be a voltage signal) from driver 202. Segment 33 of fiber 1 is substantially rigidly attached to rigid housing 203 and separated from segment 32 by compliant cladding material (or by a fluid or gel) so that the time-varying force exerted by pusher element 200 on segment 32 varies the separation between segment 32 and segment 33. The amplitude of the time-dependent driving signal from driver 202 varies in response to the amplitude of an external signal incident on conventional sensor 204 so that the separation between segments 32 and 33 will depend on the instantaneous amplitude of such external signal incident on sensor 204. It should be understood that although a single conventional sensor (sensor 204) is shown connected to drive 202 in FIG. 11, more than one such conventional sensor may be connected to driver 202 so as to cause the amplitude of the output signal from driver 202 to vary in response to the amplitude of the external signal incident on each such conventional sensor. A preferred embodiment of a modulator of the type shown in FIG. 11 will be discussed below with reference to FIG. 12.

FIG. 12 is a cross-sectional view, taken on a plane normal to the axis of optical fiber segment 33, of a preferred embodiment of an optical modulator (identified by the reference numeral 300) of the type shown semi-schematically in FIG. 11. Fiber core segments 48 and 49 in the region of segments 33 and 32 of fiber 1, respectively, are stripped of cladding, positioned substantially parallel to each other at a selected separation (of on the order of a few microns), and the space between the core segments is filled with index fluid 310 (which may be a gel) having substantially the same index of refraction as the original cladding material of fiber 1. Alternatively, stripped core segments 48 and 49 may be reclad with compliant cladding material 311 (shown in FIG. 13, to be discussed below) in the same manner as discussed above with reference to FIG. 2.

Core segments 48 and 49 are held in position at the correct operating bias point (i.e., mean separation between core segments 48 ad 49) by member 307 (rigidly attached to fiber segment 33 by adhesive material 312) and member 304 (rigidly attached to fiber segment 32 by adhesive material 312) of pusher element 301. Member 307 is bonded to micrometer housing 309 by compliant bonding material 308. Micrometer housing 309 is rigidly attached to rigid housing 303. The mean separation between core segments 48 and 49 may be coarsely adjusted by manually rotating micrometer screw 305. Micrometer screw 305 is threadedly coupled to micrometer housing 309 so that rotation of screw 305 will translate tip 306 of screw 305 (shown in contact with member 307 in FIG. 12) so as to push member 307 away from micrometer housing 309 or (when screw 305 is withdrawn toward the bottom of FIG. 12) to permit member 307 to relax toward housing 309 in response to the force exerted by stretched compliant material 308.

Member 304 is rigidly attached to pusher element 301. Pusher element housing 302 is attached to rigid housing 303. Pusher element 301 is attached to pusher element housing 302 in a manner so as to be slidable (or otherwise translatable) relative to pusher element housing 302. Pusher element 301 displaces member 304 (and hence core segment 49 of segment 32) relative to core segment 48 in response to the time-dependent potential difference (voltage) between wires 320 and 321. Wires 320 and 321 are electrically coupled to pusher element 301. Wires 320 and 321 connect pusher element 301 with a conventional sensor (not shown in FIG. 12) which produces a time-dependent voltage signal in wires 320 and 321 in response to an external physical parameter of interest (such as temperature or pressure), incident on such conventional sensor.

Pusher element 301 may be selected from any of several conventional devices, including but not limited to piezoelectric, magnetostrictive, and electro-mechanical transducers, for producing translational motion in response to a time-dependent voltage signal. For example, PZT Pusher Model PZ-30, manufactured by Burleigh Instruments, would be suitable for use as pusher element 301. Fine adjustment of the mean separation between core segments 48 and 49 may be accomplished by means of a voltage bias applied to pusher element 301. As discussed above, coarse adjustment of the mean separation may be accomplished by manual rotation of micrometer screw 305.

FIG. 13 is a cross-sectional view of the coupling region, in which region core segments 48 and 49 are positioned substantially parallel and sufficiently close to one another to facilitate evanescent coupling of light from one core segment to the other, of a modulator of the type shown in FIG. 11, illustrating a variation on the mechanical configuration of such coupling region. To form a modulator of the type whose coupling region is shown in FIG. 13, fiber core segments 48 and 49 in the region of segments 33 and 32, respectively, are stripped of cladding, positioned substantially parallel to each other at a selected separation (of on the order of a few microns), and are reclad with compliant recladding material 311 having index of refraction substantially the same as that of the original cladding material of fiber 1. The stripping and recladding operations may be performed in the same manner and with the same materials as discussed above with reference to FIG. 2.

Adhesive material 312 bonds members 307 to fiber segment 33 and member 304 to fiber segment 32. Epoxy is generally suitable for use as adhesive material 312.

The above description is merely illustrative of the present invention. Various changes in shapes, sizes, materials, time intervals, or other details of method and construction may be within the scope of the appended claims without departing from the spirit of the invention.

I claim as my invention:

1. A data gathering system comprising:
   an optical main fiber having a first and a second end and including a core and cladding material;
   means for transmitting into the first end of the main fiber an interrogating light pulse which propagates in a first direction along the main fiber;
   a modulator formed on said main fiber, said modulator comprising an optical fiber segment held substantially parallel to a first section of said main fiber in a manner so that said segment and said main fiber are separated by a distance which is variable in response to variations in an incident external signal, said modulator further comprising means for diverting a return portion of said interrogating light pulse having intensity which varies in response to the distance between said segment and said main fiber, so that the return portion propagates in the main fiber in a direction opposite said first direction; and means optically coupled to said main fiber for detecting said return portion.

2. The invention of claim 1 wherein:

said segment comprises a second section of said main fiber; and said return portion diverting means comprises a third section of said main fiber having a first end connected to said second section and a second end connected to said first section, so that said return portion comprises a portion of the interrogating pulse diverted from said first section to said second section via evanescent coupling and a portion of the interrogating pulse diverted from said second section to said first section via evanescent coupling.

3. The invention of claim 2 wherein said external signal is an acoustic signal, and said modulator further comprises:

a hollow structure defining a chamber containing air, which structure encloses said first section and said second section and substantially prevents liquid intrusion into the chamber, said structure comprising a first area and a second area, said first area adapted to move relative to said second area in response to acoustic vibrations incident on said structure;

compliant cladding material positioned between said first section and said second section;

a first pin positioned in said chamber in contact with said first area and said first section; and a second pin positioned in said chamber in contact with said second area and said second section so that acoustic vibrations incident on the structure will displace said first pin relative to said second pin and vary the distance between said first section and said second section.

4. The invention of claim 2 wherein said external signal is an acoustic signal, and said modulator further comprises:

a hollow structure defining a chamber containing air, which structure encloses said first section and said second section and substantially prevents liquid intrusion into the chamber, said structure comprising a first area and a second area, said first area adapted to move relative to said second area in response to acoustic vibrations incident on said structure;

a layer of gel, having index of refraction substantially the same as that of the cladding material of the optical main fiber, separating said first section from said second section;

a first member positioned in said chamber in contact with said first section and said first area; and a second member positioned in said chamber in contact with said second section and said second area so that acoustic vibrations incident on the structure will displace said first member relative to said second member and vary the distance between said first section and said second section.

5. The invention of claim 2 wherein said external signal is a voltage signal, and wherein said return portion diverting means comprises:

a housing attached to said first section; and a pusher element attached to the housing and to said second section in a manner so that the pusher element moves said second section relative to said first section in response to variations in the voltage signal, so as to vary the distance between said first section and said second section in response to variations in the voltage signal.

6. The invention of claim 2, wherein said modulator further comprises:

a sensor for producing a voltage signal in such a manner that a characteristic of said voltage signal will vary in response to variations in an external signal incident on said sensor;

a housing attached to said first section; and a pusher element electrically coupled to the sensor, and attached to the housing and to said second section in a manner so that the pusher element moves said second section relative to said first section in response to variations in the voltage signal, so as to vary the distance between said first section and said second section in response to variations in the voltage signal.

7. The invention of claim 1 wherein:

said segment is an optical fiber separate from said main fiber, said optical fiber having a highly reflective, flat first end face oriented substantially perpendicular to the axis of said optical fiber, and a highly reflective, flat second end face oriented substantially perpendicular to the axis of said optical fiber; and said return portion comprises a portion of said interrogating pulse diverted from said main fiber into said optical fiber via evanescent coupling and then diverted via evanescent coupling from said optical fiber back into said main fiber so as to propagate in said main fiber in the direction opposite said first direction.

8. The invention of claim 7 wherein said external signal is an acoustic signal, and said modulator further comprises:

a hollow structure defining a chamber containing air, which structure encloses said optical fiber and said first section of the optical main fiber and substantially prevents liquid intrusion into the chamber, said structure comprising a diaphragm adapted to move relative to said first section of the optical main fiber in response to acoustic vibrations incident on said structure; and a compliant member attached between said diaphragm and said first section, and including a compliant layer having index of refraction substantially the same as that of the cladding material of the optical main fiber, which compliant layer is positioned between said optical fiber and said first section so that acoustic vibrations incident on the structure will vary the distance between said optical fiber and said first section.

9. The invention of claim 1 wherein said return signal detecting means comprises a first transducer for converting at least part of the return portion into a first electrical signal.

10. The invention of claim 9 further comprising:

a directional coupler optically coupled to said main fiber between said first end of said main fiber and said modulator;

a first optical branch fiber optically coupled to the directional coupler so that light propagating in said main fiber toward said modulator is diverted by said directional coupler into said first optical branch fiber;

monitor means optically coupled to the first optical branch fiber for detecting light diverted into said first optical branch fiber by said directional coupler; and a second optical branch fiber optically coupled to the directional coupler and to the return signal detecting means so that the return portion propagating in said main fiber is diverted by said directional coupler through said second optical branch fiber to said return signal detecting means.

11. The invention of claim 1 further comprising means attached to the modulator for reducing the effect on the intensity of the return portion due to change in the incident external signal which change has a rate of change below a selected minimum rate.

12. A data gathering system employing time-division multiplexing, comprising:

an optical main fiber having a first end and a second end;

means for transmitting into the first end of the main fiber, at a first instant, an interrogating light pulse which propagates in a first direction along the main fiber;

at least two modulators formed on said main fiber, each of which said modulators comprises an optical fiber segment held substantially parallel to a first section of said main fiber in a manner so that said segment and said main fiber are separated by a distance which is variable in response to variations in an incident external signal, each of said modulators further comprising means for diverting a return portion of said interrogating light pulse having intensity which varies in response to the distance between said segment and said main fiber so that the return portion propagates in the main fiber in a direction opposite said first direction; and means optically coupled to said main fiber for detecting the return portion from each of said modulators.

13. The invention of claim 12 wherein:

said segment comprises a second section of said main fiber; and said return portion diverting means comprises a third section of said main fiber having a first end connected to said second section and a second end connected to said first section, so that said return portion comprises a portion of the interrogating pulse diverted from said first section to said second section via evanescent coupling and a portion of the interrogating pulse diverted from said second section to said first section via evanescent coupling.

14. The invention of claim 12 wherein:

said segment is an optical fiber separate from said main fiber, said optical fiber section having a highly reflective, flat first end face oriented substantially perpendicular to the axis of said optical fiber, and a highly reflective, flat second end face oriented substantially perpendicular to the axis of said optical fiber; and said return portion comprises a portion of said interrogating pulse diverted from said main fiber into said optical fiber via evanescent coupling and then diverted via evanescent coupling from said optical fiber back into said main fiber so as to propagate in said main fiber in the direction opposite said first direction.

15. The invention of claim 12 wherein said return portion detecting means comprises a first transducer generating a first electric signal having instantaneous amplitude which varies in response to the instantaneous amplitude of the return portions detected by the return portion detecting means.

16. The invention of claim 15 wherein said first electrical signal has instantaneous amplitude substantially proportional to the instantaneous amplitude of the return portions detected by the return portion detecting means.

17. The invention of claim 15 further comprising:

a directional coupler optically coupled to said main fiber and positioned so that the interrogating pulse will reach the directional coupler prior to reaching any of the modulators;

a first optical branch fiber optically coupled to the directional coupler so that a portion of the interrogating pulse propagating in said main fiber toward said modulators is diverted by said directional coupler into said first optical branch fiber;

monitor means optically coupled to the first optical branch fiber for detecting the portion of the interrogating pulse diverted into said first optical branch fiber by said directional coupler; and a second optical branch fiber optically coupled to the directional coupler and to the return portion detecting means so that the return portion propagating in said main fiber is diverted by said directional coupler through the second optical branch fiber to said return portion detecting means.

18. The invention of claim 17 wherein the monitor means comprises a second transducer for converting at least part of the portion of the interrogated pulse diverted into said first optical branch fiber into a second electrical signal, and further comprising:

signal processing means electrically coupled to the first transducer and to the second transducer for converting said first electric signal and second electrical signal into an array signal representing the total power of the return portions returned from a selected subset of said at least two modulators.

19. The invention of claim 18 wherein the signal processing means further comprises:

means for generating a third electrical signal having amplitude at any second instant after said first instant substantially proportional to the time integral of said first electrical signal, integrated from said first instant to said second instant; and means for applying said third electrical signal to said first electric signal so as to reduce the effect on said first electric signal due to upstream modulator losses on the return portion from each of the modulators in said selected subset, and to reduce the effect on said array signal due to said upstream modulator losses.

20. The invention of claim 18 wherein the transmitting means is adapted to transmit successively a plurality of substantially identical interrogating pulses into the first end of the main fiber, and wherein the signal processing means further comprises:

means for generating a fourth electrical signal having amplitude following the peak amplitude of said second electrical signal; and means for applying said fourth electrical signal to said first electrical signal so as to reduce the effect on said first electrical signal due to differences between the interrogating pulses and to reduce the effect on said array signal due to differences between the interrogating pulses.

21. The invention of claim 20 wherein the signal processing means further comprises:
   means for sampling the first electric signal prior to application of said third electric signal to said first electric signal during selected periods when the data gathering system is in a quiet state;
   means for holding the sampled signal; and
   means, including a differential amplifier, for applying the held signal to said first electric signal in a manner so as to reduce the effect on the intensity of said first electric signal due to changes in the average external conditions affecting the modulators between successive interrogating pulse transmissions.

22. The invention of claim 12 further comprising means attached to each of the modulators for reducing the effect on the intensity of the return portion due to change in the external signal incident on the modulator which change has a rate of change below a selected minimum rate.

* * * * *